United States Patent
Carino

(10) Patent No.: US 10,424,297 B1
(45) Date of Patent: Sep. 24, 2019

(54) VOICE COMMAND PROCESSING FOR CONFERENCING

(71) Applicant: SHORETEL, INC., Sunnyvale, CA (US)

(72) Inventor: Eric N. Carino, Milpitas, CA (US)

(73) Assignee: Mitel Networks, Inc., DE (US)

( * ) Notice: Subject to any disclaimer, the term of this patent is extended or adjusted under 35 U.S.C. 154(b) by 46 days.

(21) Appl. No.: 15/423,028

(22) Filed: Feb. 2, 2017

(51) Int. Cl.
| | |
|---|---|
| G10L 15/22 | (2006.01) |
| G10L 25/78 | (2013.01) |
| G10L 17/00 | (2013.01) |
| G10L 17/04 | (2013.01) |
| H04L 29/06 | (2006.01) |
| G10L 15/18 | (2013.01) |

(52) U.S. Cl.
CPC .......... *G10L 15/22* (2013.01); *G10L 15/1822* (2013.01); *G10L 17/005* (2013.01); *G10L 17/04* (2013.01); *G10L 25/78* (2013.01); *H04L 65/403* (2013.01); *G10L 2015/223* (2013.01)

(58) Field of Classification Search
CPC ....... G10L 15/22; G10L 17/04; G10L 17/005; G10L 15/1822; G10L 25/78; G10L 2015/223; H04L 65/403
USPC ....................................................... 704/235
See application file for complete search history.

(56) References Cited

U.S. PATENT DOCUMENTS

| | | | | |
|---|---|---|---|---|
| 7,062,019 B2* | 6/2006 | Krack | ................... | H04M 3/533 379/88.04 |
| 8,060,366 B1 | 11/2011 | Maganti et al. | | |
| 8,234,335 B1* | 7/2012 | Haldar | ................ | H04L 65/4061 709/204 |
| 8,305,939 B2* | 11/2012 | Chen | .................... | H04L 12/1822 370/260 |
| 8,719,039 B1 | 5/2014 | Sharifi | | |
| 9,031,845 B2* | 5/2015 | Kennewick | ......... | G06F 16/3329 704/270 |
| 9,087,516 B2* | 7/2015 | Crawley | ................. | G10L 15/22 |
| 9,245,254 B2* | 1/2016 | Lord | ................... | H04L 12/1831 |
| 9,456,176 B2* | 9/2016 | Baldwin | ................ | H04N 7/152 |
| 9,489,171 B2* | 11/2016 | Klein | ....................... | G06F 3/167 |
| 9,495,957 B2* | 11/2016 | Weider | .................... | G10L 15/22 |
| 9,520,130 B2* | 12/2016 | Sharifi | .................... | G10L 15/22 |
| 9,530,414 B2* | 12/2016 | Zhao | ....................... | G10L 15/22 |
| 10,074,364 B1* | 9/2018 | Wightman | .............. | G10L 15/20 |
| 2003/0125954 A1 | 7/2003 | Bradley | | |
| 2004/0083101 A1* | 4/2004 | Brown | ................ | G10L 15/1822 704/235 |

(Continued)

FOREIGN PATENT DOCUMENTS

| | | | |
|---|---|---|---|
| EP | 1798945 A1 | 6/2007 | |
| EP | 2146491 A1 | 1/2010 | |

(Continued)

*Primary Examiner* — Edwin S Leland, III

(57) ABSTRACT

An example method includes receiving at a conference bridge media from a plurality of participants during a conference session and mixing the media received from the plurality of participants to provide mixed media. At least one utterance of the mixed media is parsed using natural language processing to determine a command and at least one subject or object associated with the command. The method also includes invoking a selected conference function during the conference session based on the determined command and each identified subject or object.

23 Claims, 4 Drawing Sheets

(56) References Cited

U.S. PATENT DOCUMENTS

| | | | |
|---|---|---|---|
| 2006/0217967 A1* | 9/2006 | Goertzen | G06F 3/16 |
| | | | 704/201 |
| 2007/0033005 A1* | 2/2007 | Cristo | G06F 17/279 |
| | | | 704/9 |
| 2008/0120665 A1* | 5/2008 | Relyea | H04N 21/4147 |
| | | | 725/110 |
| 2008/0181140 A1* | 7/2008 | Bangor | H04L 12/1818 |
| | | | 370/261 |
| 2008/0232556 A1 | 9/2008 | Gilbert et al. | |
| 2009/132256 A1 | 5/2009 | Geldbach et al. | |
| 2011/0066435 A1 | 3/2011 | Tomono et al. | |
| 2011/0286583 A1* | 11/2011 | Hultkrantz | H04M 3/42204 |
| | | | 379/88.01 |
| 2013/0141516 A1 | 6/2013 | Baldwin | |
| 2014/0095175 A1* | 4/2014 | Lee | G10L 15/26 |
| | | | 704/275 |
| 2014/0122089 A1* | 5/2014 | Lee | G10L 15/00 |
| | | | 704/275 |
| 2014/0289326 A1* | 9/2014 | McCormack | H04L 65/1006 |
| | | | 709/204 |
| 2015/0012280 A1* | 1/2015 | Shin | G10L 15/22 |
| | | | 704/275 |
| 2015/0025887 A1* | 1/2015 | Sidi | G10L 17/02 |
| | | | 704/245 |
| 2015/0066479 A1* | 3/2015 | Pasupalak | G06F 17/27 |
| | | | 704/9 |
| 2017/0140750 A1* | 5/2017 | Wang | G10L 15/02 |
| 2017/0339340 A1* | 11/2017 | De Bayser | H04W 76/10 |

FOREIGN PATENT DOCUMENTS

| | | |
|---|---|---|
| EP | 2178287 B1 | 5/2015 |
| WO | 2001078443 A2 | 10/2001 |
| WO | 20150184186 A1 | 12/2015 |

* cited by examiner

VOICE COMMAND PROCESSING FOR CONFERENCING

TECHNICAL FIELD

This disclosure relates generally to processing voice commands for a conference call.

BACKGROUND

Telecommunication conference services are commonly used to conduct meetings among participants distributed across different locations. For example, by calling a conference bridge number and entering either the host code or a conference code, all of the conference callers are bridged onto the conference call, which may include bridging of audio and/or audio-video. In some cases, the conference call may be integrated with an online service that enables desktop and application sharing as well as other advanced conferencing tools, such as recording, muting and unmuting, adding/dropping participants, conducting a sidebar, instant messaging, as well as other related access and management functions.

SUMMARY

This disclosure relates generally to processing voice commands for a conference call.

One example provides a method that includes receiving at a conference bridge media from a plurality of participants during a conference session and mixing the media received from the plurality of participants to provide mixed media. At least one utterance of the mixed media is parsed using natural language processing to determine a command and at least one subject or object associated with the command. The method also includes invoking a selected conference function during the conference session based on the determined command and each identified subject or object.

Another example provides a conference system. The conference system includes a mixer to mix media received from a plurality of participants and to provide mixed media data during a conference session. A natural language processing (NLP) engine parses at least one utterance of the mixed media using natural language processing to determine a command and at least one subject or object associated with the command. A conference manager invokes a selected conference function for execution during the conference session based on the determined command and each identified subject or object.

DETAILED DESCRIPTION

This disclosure relates to processing voice commands for a conference call. Conferencing systems and methods monitor (e.g., in real time) mixed media data containing voice audio for a plurality of participants during a conference call. Natural language processing (NLP) is performed on one or more utterances (e.g., detected snipped of voice audio) that is extracted from the mixed media data to determine a command and at least one subject or object associated with the command. The selected conference function is invoked during the conference call based on the determined command and each identified subject or object. In some examples, the conference function is invoked automatically or, in other examples, the conference function is invoked in response to a user input entered by a participant. For instance, a request may be sent to one or more participants to which the conference function is to be applied or to a leader/host participant, which can vary depending on the function.

The command being invoked corresponds to a selected conferencing function and the subject or object is a participant and/or resource to which the command applies. For example, the conferencing function is selected from set of predefined conferencing functions, such as relating to controlling flow of audio or audio-video or controlling integrated online services (e.g., desktop and application sharing). By invoking selected conference functions based on NLP of the mixed audio conversation among participants, conference functions can be predictively applied during the conference call with little or no user input. As a result, conferencing functions can be executed more efficiently and the overall user experience improved.

Figure 1:
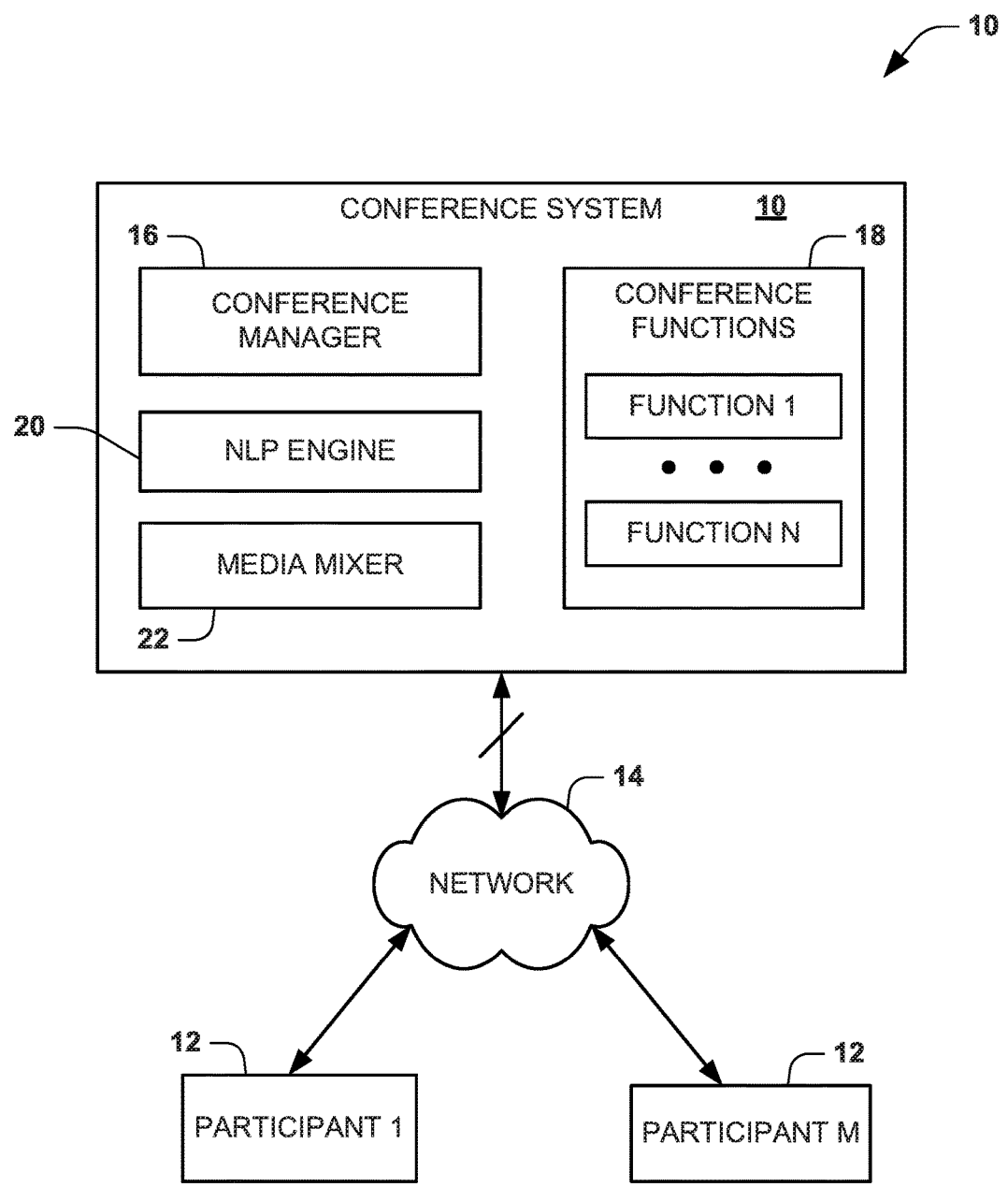
FIG. 1 depicts an example of a conferencing system implementing NLP.

FIG. 1 depicts an example of a conference system 10. The conference system 10 provides a platform to enable collaboration among a plurality of participants 12 during a conference session. As used herein, a conference session (also described herein to as a conference call) refers to any communication session among a group of participants that involves sharing one or more type of media that is communicated, at least in part, during the respective session. In the examples disclosed herein, the conference session includes an audio voice conferencing that involves at least communication of audio conferencing data among participants, and may also include video data, graphical media, short message service (SMS) messaging, online chat as well as one or more other forms of communication.

Each participant 12 utilizes one or more endpoint resources in a conference call. During a conference session, for example, one or more endpoint resources associated with each of the participants 12 is connected via network 14 to a conference server, which is implemented and managed by the conference system 10. Examples of endpoint resources include hardware and/or software, such as desktop phones, softphones, mobile phones, web browsers, a virtual phone (e.g., software executing on a computer), audio-videophones or any other devices that originate and/or terminate a media stream.

Each endpoint resource that is configured to communicate audio during a conference session employs a codec for communicating its audio to a conference bridge implemented by the conference system 10. During the call, a given endpoint resource thus may communicate audio, video and/or other forms of media over one or more connections via the network 14. In some examples, a participant may use multiple different endpoint resources and concurrently connected to the conference session and associated with such participant, such as for communicating different types of media. In other examples, a single endpoint resource associated with the participant may be configured to communicate multiple types of media with the conference server, concurrently or sequentially, during the conference session.

The network 14 can include any arrangement of local networks and public networks, such as including physical connections (e.g., wired, optical fiber) and/or wireless connections (e.g., cellular, WiFi, WiMan). The types and arrangement of connections that provide the network 14 will vary according to the type and location of each of the endpoint resources that the participants 12 use to connect to the conference system 10, and the type and location of the conference system.

As an example, the conference system 10 may be implemented as a private (e.g., single tenant) enterprise conference system. As another example, the conference system 10 may be implemented as a cloud-based system, such as a single or multi-tenant system. As yet another example, the conference system 10 may be implemented as a hybrid cloud system in which some of the conferencing functions are premise-based (e.g., at a local enterprise conference server) and one or more other conference functions are implemented in a computing cloud. Regardless of the architecture for the conference system 10, the conference system includes hardware and/or software to communicate media to and from participants 12 using one or more connections with the network 14, which connection(s) provides an aggregate bandwidth for communicating conference media. The hardware and/or software forming the conference system may be all co-located, such as at a central conference server, or it may be distributed across a plurality of conference servers.

In the example of FIG. 1, the conference system 10 includes a conference manager 16 that is configured to control operation of hardware and software implemented by the conference system. For example, the conference manager 16 can be implemented as including hardware and/or software that directs other hardware and software in the conference system to execute tasks at appropriate times. The conference system 10 may support any number of one or more conference sessions concurrently, each of which can include a number of participants 12. In some examples, a single conference session may include multiple conference bridges that the conference manager 16 controls to combine and distribute media for participants that are connected to each such conference bridge. A given connection thus may itself include a stream of media from a single participant or it may include mixed media stream from two or more participants up to and including all participants of the respective conference session.

As an example, the conference manager 16 controls and maintains connections with participant endpoint resources involved in one or more conference media sessions as well as controls the flow of media and other data associated with each conference session. The conference manager 16 also controls various conferencing functions 18, demonstrated as Function 1 through Function N, where N is a positive integer. For example, some controls and/or functions 18 implemented by the conference manager 16 are implemented in an automated fashion associated with establishing and maintaining the conference call session. Other controls and functions 18 implemented by the conference manager 16 may be implemented in response to requests or commands and related responses. For instance, as disclosed herein, the conference manager 16 may implement conferencing functions 18 based on commands determined by an NLP engine 20 (e.g., determined by continuously monitoring mixed media during the session). Additionally or alternatively, the conference manager 16 may make execution of some requests or commands to perform functions 18 during a given conference session responsive to a user input, such as made via an input user interface (e.g., a human machine interface) of a participant endpoint resource that is connected with the given conference session.

The conference manager 16 may also control a media mixer 22 during a conference session. The media mixer 22 can be implemented as a hardware and/or software that receives media from one or more participants (e.g., from associated endpoints) 12, either directly or via a conference bridge. The media mixer 22 mixes the received media and transmits the mixed media to one or more participants for the respective conference session. As an example, the mixer 22 can be implemented as or include one or more switches that connect via the network 14 to endpoint connections directly or through one or more other conference bridges for communicating media to and from the participants 12. For instance, the conference manager 16 can control which active participants 12 receive the mixed media and provide the mixed media for their respective users. The same mixed media may be transmitted to all participants during the conference session. In other examples, the conference manager may selectively control the mixer to provide different media to different participants of the same conference session.

The NLP engine 20 monitors the mixed media provided by media mixer 22 and parses utterances provided in the mixed media stream. NLP engine 20 detects words within one or more utterances to determine a conceptual "meaning" (e.g., the speaker's intent) by analyzing their grammatical relationship and relative context, which may include analysis in relation to one or more other utterances. In the context of the conference system 10, the NLP engine 20 parses one or more utterances to detect a spoken command word or phrase along with an identity of one or more subjects or objects that are associated with the command.

As an example, the NLP engine 20, in parsing an utterance, detects words within the utterance(s) in the mixed media stream provided by media mixer 22. Thus an utterance may be spoken by one or more persons. The NLP engine performs speech recognition to detect words in each utterance based on voice audio provided in the mixed media stream. Detected words may be stored as text in memory. In addition to detecting words in an utterance, metadata associated with each extracted utterance can also be stored in memory of the conference system for use by a NLP engine 20. Such metadata can include, for example a start time and an end time associated with each extracted utterance.

The metadata associated with an utterance can also include an identification of a participant who is speaking the utterance, such determined from the media received from the participants. Various mechanisms may be used, individually or collectively, to determine which participant or participants are speaking. For instance, the conference manager 16 can tag the media data with an identity of a respective participant from where the utterance originates, such as based on monitoring input connections to the media mixer. For known users, speech recognition on media may be used to identify participants. Additionally or alternatively, the identity of one or more participants may be ascertained from context determined based on speech recognition in the NLP engine 20. For example, if one participant says, "Joe, what do you think about that?" The NLP engine 20 can determine that the next person to speak is "Joe" and assign a corresponding identity to such participant and associated media stream.

As a further example, participants of a conference session may be pre-registered, such as in response to accepting an invitation to the conference session. The pre-registration information, such as may include an email address, name, phone number or the like, can be stored in memory for the conference session in advance of the conference. As a given participant 12 connects to the conference session via a given connection, conference manager 16 can associate the connection with a given participant. The conference manager thus may store the associated participant identify information that is provided as part of the pre-registration and/or joining process in memory as participant data. In addition to a participant identity, a name associated with a participant or a group of participants can also be stored in memory for a given conference session. Examples of participant identify information can include a phone number from which the participant called in, an email address associated with a participant or other information that may be entered into the conference session (e.g., via a graphical user interface on a web based system). In yet another example, a host of a leader of a conference session can manually enter participant information into one or more data entry fields of a GUI that the conference manager provides to the host. In some examples, when a participant is identified as speaking, the conference manager 16 may also activate a status function (e.g., one of the functions 18) to display participant status on an online display (e.g., a web service) during the conference session.

The metadata, such as including participant ID and related utterance time information, thus can facilitate further analysis and processing of the words and phrases detected by the NLP engine 20. For example, the NLP engine 20 analyzes the detected word or phrase by searching an NLP database that includes a set of commands corresponding to the conference functions 18. If the search fails to determine a matching entry for the command word or phrase, the NLP engine 20 can take no action. If the search determines a matching entry for the word or phrase, the NLP engine 20 returns a command input to the conference manager 16.

In addition to determining that a command word or phrase is spoken during the conference session, the NLP engine 20 also is programmed determine one or more subjects or objects associated with each command word or phrase. As used herein, the subject or object corresponds to a participant or a participant device (e.g., hardware and/or software) that is connected with the conference session via a respective connection or more than one connection. This may be done as part of the command word processing, concurrently but separately or after such processing and based on the results of the command word processing—assuming the NLP determines the utterance included a command word or phrase. The NLP engine 20 can determine each subject or object based on analyzing the detected words from the same utterance or another utterance before for or after the utterance that provided the command word/phrase. For example, the NLP engine 20 searches another NLP database (a names database) that includes a list of given names of persons (e.g., first names), personal pronouns that may be spoken during a conference call. Since conferences often involve persons in multiple countries, including where more than one language is spoken, the names database may include any number of languages. In some examples, the NLP name database may be populated and/or updated to include names derived from the participant identity information.

If the search determines a matching entry for identifying one or more subjects or objects, the NLP engine 20 may include the subject or object as part of the command input provided to the conference manager 16. As an example, an NLP engine 20 is programmed to provide the command input for a determined conference function according to a predefined schema for a conference call session. The command input, for example, can include an identification of the conference function and a set of the determined subjects and/or objects. The command input may also include the metadata associated with the utterance (or utterances) based on which the command and subject/object information was determined. The conference manager 16 thus can employ the command input and associated metadata to invoke the determined command function for one or more participants based on each determined subject or object. In some examples, the NLP can provide the command input the conference manager in a form that includes an identification of the command associated parameters sufficient to invoke the selected function. As mentioned, when a function is invoked it may execute automatically (without any user input). In other examples, invoking a selected function 18 in response to the command input may require user input (e.g., via an endpoint resource) to confirm that one or more participants wish to execute the selected conference function 18.

In view of the foregoing, the NLP engine 20 can continuously monitor and analyze a sequence of utterances in the mixed media stream to determine commands for invoking one of the conference functions 18 as well as to identify and confirm subjects or objects associated with each such function. Since the conference functions 18 typically will be a predetermined set of limited functions associated with the conference session, a NLP engine 20 can quickly ascertain sufficient keywords associated with each such function to predicatively supply command inputs to the conference manager 16 for invoking functions 18 during the conference session. In this way, pauses that tend to occur during live conference calls can be reduced and in some cases eliminated by the automatic and/or semiautomatic execution of conference functions 18 based on command inputs provided by the NLP engine. Even in situations where the conference manager 16 sends requests to a given user to confirm execution of the command being invoked, the resulting execution still should be expedited when compared to existing conference systems.

Figure 2:
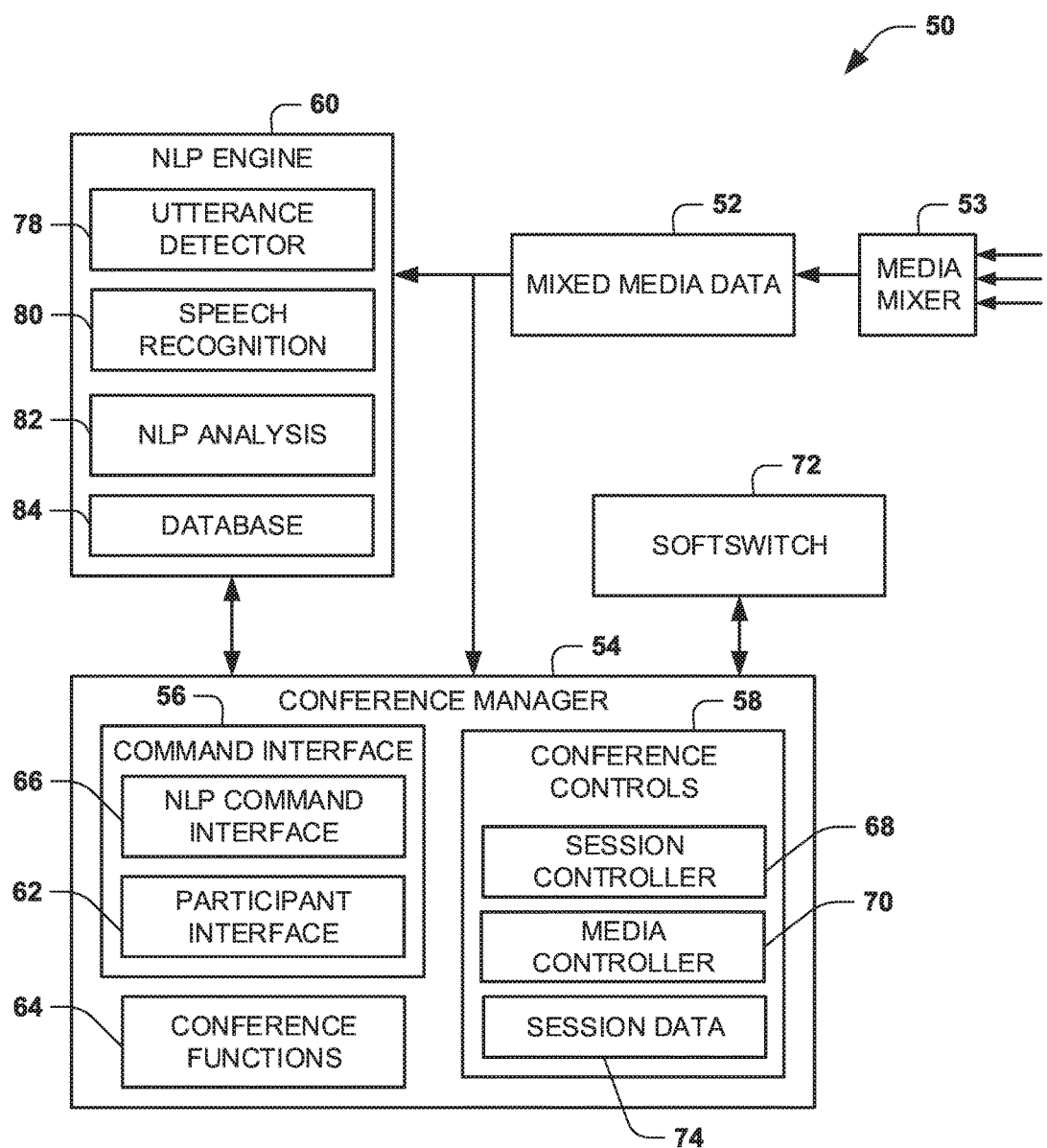
FIG. 2 depicts an example of an intra-conference voice command processing subsystem for activating conferencing functions.

FIG. 2 depicts an example of another conference system 50 to implement conference functions 64 based on natural language processing of mixed media data 52 provided by a media mixer 53 during a conference session. The conference system 50 includes a conference manager 54 to implement control and management functions associated with a given conference session. For example, a separate instance of the conference manager 54 (e.g., software and/or hardware) may be implemented at one or more conference servers for each conference session. The conference manager 54 may correspond to conference manager 16 and NLP engine 60 may correspond to engine 20 of FIG. 1 such that reference may be made to FIG. 1 for additional information.

In the example of FIG. 2, the conference manager 54 includes a command interface 56, conference functions 64 and conference controls 58. The command interface 56 is configured to receive and process input commands for implementing conference controls 58 and functions 64. The command interface 56 includes an NLP command interface 66 to invoke the functions 64 and/or controls 58 in response to command input data provided by the NLP engine 60. For instance, the NLP interface 66 invokes a selected conference function 64 in response to the command input determined by the NLP engine 60 from the mixed media data 52.

Additionally or alternatively, the command interface 56 can process commands received via a participant interface 62. The participant interface 62, for example, includes a graphical user interface (GUI) that is provided via a web portal associated with the conference session. The conference manager 54 can provide a static GUI to activate some functions and controls. The conference manager 54 may also selectively generate other GUI features to one or more participant's web interface to enable the user to activate functions and respond to requests that may be provided during the conference (e.g., a graphical overlay to online conference portal). In other examples, the participant interface 62 can receive instructions from an end point device (e.g., telephone), such as instructions corresponding to predefined DTMF codes entered via a keypad or predetermined words spoken by the user in a microphone. Other types of participant interfaces may be implemented for user interaction during the conference session depending upon the type of end point device on the form of media being communicated between the endpoint device and the conference system 50. The command interface 56 is thus configured to invoke one or more conference functions 64 in response to commands received via the NLP engine 60 and/or commands received via the participant interface 62.

In the example of FIG. 2, conference controls 58 include a session controller 68 and a media controller 70. For example, a session controller 68 can control session parameters associated with a given conference session such as including controlling connections to the conference session, such as via a soft switch 72, as well as associated session parameters (e.g., setting up and tearing down call legs, tracking participant inputs, setting communication parameters, etc.). Conference manager 54, for example, controls soft switch 72 in response to authenticating users to a conference session such as by entering user name and conference ID and any applicable password. Soft switch 72 can be utilized thus to connect participants to a given session.

The media controller 70 can control the flow of media in one or more forms associated with a conference session. The media includes audio streams to and from each of the respective participants as well as may include other forms of media data, such as graphical data, video data and the like, that may be provided concurrently to one or more users according to the endpoint devices with which the participants connect to the session. The media controller further may control media parameters for conference media that is provided to each participant (e.g., audio volume, bandwidth, resolution for graphics and video, etc.).

Additionally, conference controls 58 can store session data 74 associated with the given conference session. The session data 74 can include context data and participant data. The context data can include parameters representing the state of each connection involved in the conference session. Examples of a context data can include data specifying whether a given connection is muted or unmuted, types of media being communicated via each connection, codecs for endpoint devices, and other protocol information. Participant data can include identity data for each respective participant in the session, such as a unique identifier for each participant (e.g., phone number), participant name, role data specifying each participant's role in the conference session.

As an example, the role data can specify if a participant is an organizer or host of the conference session, if the participant is an active or inactive participant in the conference session. The role may also be changed, such as in response to a user input in which a host or other authorized participant changes the role for another participant (e.g., making another participant leader). In such a role based session, for example, different sets of the conference functions 64 may be available for execution by different participants depending on their respective role (e.g., defined by the role data) in the conference session. In addition to different conference functions assigned to different users, the conference manager can send requests to different users depending on their current role (e.g., role data) in the session. For example, conference manager 54 may send a request to the current leader to confirm whether or not to invoke some or all conference functions that are invoked via the NLP interface 66 (e.g., in response to a command input from NLP engine 60).

As a further example, the mixed media data 52 is provided to the conference manager 54 and to the NLP engine 60. The mixed media data 52 enables the NLP engine 60 to monitor a signal audio stream as well as facilitates determining commands based on utterances from any number of participants. In this example, the NLP engine 60 includes an utterance detector 78 to extract snippets of audio from the mixed media stream. As mentioned, each utterance may include a voice audio from one or more participants. The NLP engine 60 also includes a speech recognition module 80 that parses the detected utterance, which has been extracted from the mixed media data 52, to provide corresponding text such as one or more words and/or phrases.

Detected words may be stored in memory and be passed to an NLP analysis module 82. In some examples, the NLP analysis module 82 can also employ associated metadata to facilitate processing and determining a command from the mixed media data 52. Such metadata may include or be derived from the session data 74, such as including an identification of which participant spoke a given utterance, a role associated with the speaker and other participants who may be identified, as well as timing information associated with the spoken words, such as disclosed herein. The NLP analysis module 82 analyzes the text provided by the speech recognition module 80 to determine if the utterance includes a voice command spoken during the conference session as well as one or more subjects or objects associated with the command. The NLP analysis module 82, for example, employs one or more NLP processes to search a database 84 and determine if an available command is spoken in the utterance. The database 84 may include one or more database or other structure that includes a list of commands corresponding to the conference functions 64. Additionally, the database may include or be configured to access a portion of the session data 74, such as to enable the NLP engine 60 to ascertain an identity of one or more participants based on searching the database for detected words.

In some examples, prior to searching the database 84, the NLP analyzer 82 of NLP engine 60 can perform semantic expansion and/or replace one or more potentially matching words according to a predefined search format. Other types of grammar and syntax rules (e.g., according to conference-specific grammar files, diction files or the like) may be applied to the words and/or phrases prior to searching to convert the words/phrases to a search format that facilitates searching of the NLP database.

In response to determining a command, the NLP engine 60 provides the command and associated object or subject to NLP command interface 66 of the conference manager 54. For example, command interface 56 employs the command input data from NLP engine 60 to invoke a corresponding conference function 64. As mentioned, the command interface 56 may invoke conference functions 64 and execute such function automatically or in a semi-automatic manner (e.g., in response to a user input received via participant interface 62 confirming to execute the function). In some cases, the request for user input to complete execution of a conference function may be programmed into and be part of the respective function.

In response to invoking a conference function 64 (e.g., by command interface 56), the conference controls 58 are employed to control resources to enable proper execution of the function within the context of the current conference session. For example, the conference controls 58 employ the session controller 68 to create and/or modify connections between conference resources and participant endpoint devices to enable the flow of media to implement the function. Media controller 70 further can control and/or modify the flow of media (e.g., audio, video and/or graphics) to implement the invoked function. Conference controls 58 also update the session data 74 according to each function being executed, including changes in context and state information associated with the conference session and changes to participant data based on user interaction with the executed function 64.

Figure 3:
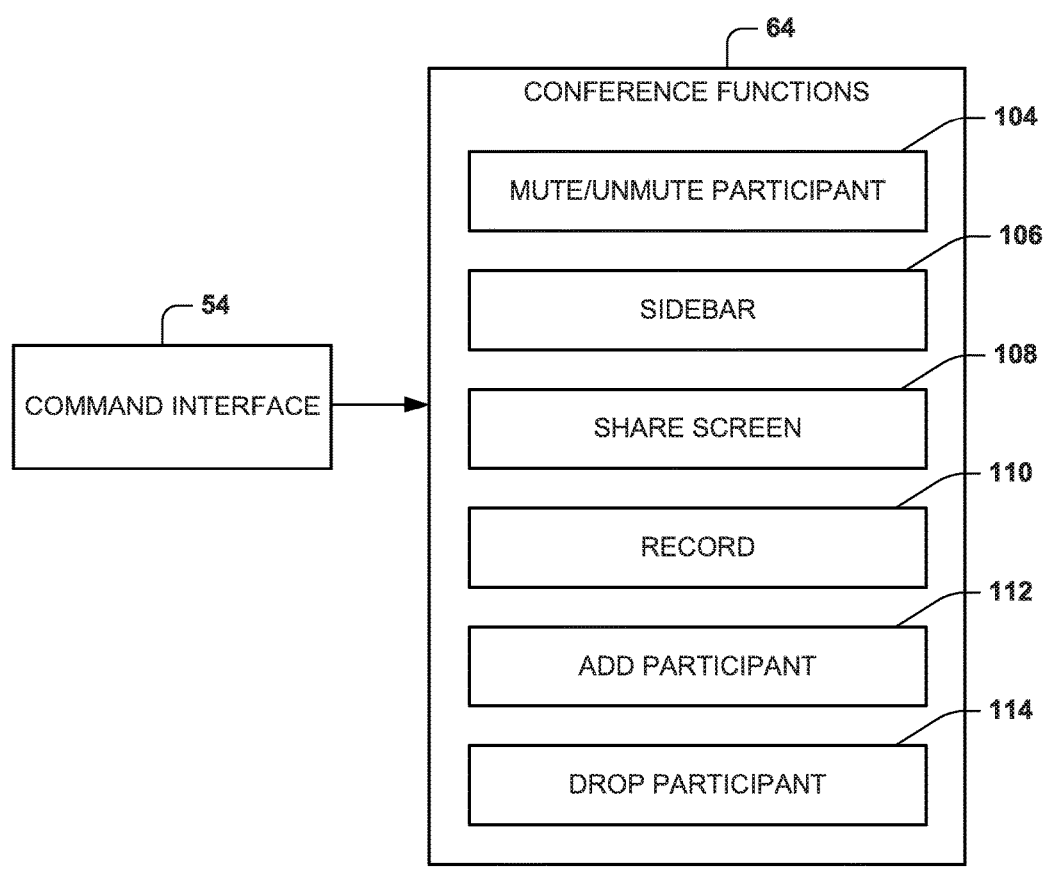
FIG. 3 depicts an example of a command library.

In view of the foregoing, a given conference system may include a number of different conference functions that may be invoked based on NLP processing of a media stream. FIG. 3 depicts an example of some conference functions 64 that may be invoked by a command interface 56 (e.g., or conference manager 16). As one example, the command interface 56 employs a set of application program interfaces (APIs) and/or function calls to invoke and execute each of the conference functions 64. Additionally, as described herein, some conference functions 64 may be locally implemented within a conference bridge (e.g., an enterprise conference bridge at a user location) and/or conference functions may be distributed across a network (e.g., network 14) such as in a computing cloud. Thus, the conference functions 64 can be implemented in a variety of computing architectures.

In the example of FIG. 3, the conference functions include a mute/unmute participant function 104, a sidebar function 106, share screen function 108, a record function 110, and add participant function 112 and a drop participant function 114. The example functions 104-114 can vary from that shown according to application requirements and the available functionality implemented by a conference manager, such as including a smaller or larger set of feature functions. For example, the available function for a given conference session may depend on a predetermined contract or subscription. The command interface 56 is configured to direct other conference functions 64 to execute their tasks at appropriate time.

The mute/unmute function 104 is configured to selectively mute or unmute the endpoint device for a given participant to ensure that such endpoint does not transmit media to the rest of the call participants. For example, the mute/unmute function receives the determined identity of the participant and provides connection information to the media mixer stop mixing media received from the participant when being muted. The mute may be activated or deactivated (unmuted) manually by the user in response to a user input (e.g., via participant interface 32) or in response to an NLP command determined from the mixed media stream (e.g., via NLP command interface 66), such as disclosed herein. For instance, the command interface 56 may invoke the function 104 to unmute a currently muted participant, automatically or semi-automatically, in response to detecting a question directed specifically to the muted participant.

The sidebar function 106 is configured to initiate a side conference call with one or more other participants in response to command instructions from the command interface 56. Participants to the sidebar conference session (e.g., a sub-conference session) may be existing or new participants to the current conference session (the main session). The sidebar function 106 may be invoked manually by the user in response to a user input (e.g., via participant interface 62) or in response to an NLP command determined from the mixed media stream (e.g., via NLP command interface 66), such as disclosed herein. For instance, in response to being invoked, the sidebar function 106 employs conference controls 58 to modify and control various media channels between endpoints as required to implement a sidebar during the conference session. During execution of the sidebar, for example, during the sidebar participants may hear the main conference sessions, but the participants who are in the main session but not the sidebar cannot hear the conversation between sidebar participants. For example, media mixer can provide multiple mixed media channels, including one that combines all audio media for the sidebar participants and another that includes the main session but excludes the sidebar conference session. In other examples, the sidebar function can employ conference controls to keep the media (e.g., audio and/or video) for the sidebar conference session completely separated from the main conference session.

The screen sharing function 108 is configured to enable one or more participants to share content, such as including a web browser or one or more other displayed applications, in response to command instructions from the command interface 56. The screen sharing function 108 may be invoked manually by the user in response to a user input (e.g., via participant interface 62) or in response to an NLP command determined from the mixed media stream (e.g., via NLP command interface 66), such as disclosed herein. The screen sharing function 108 can employ screen sharing software application or otherwise uses a screen sharing service to enable the designated participant to share content, such as including a web browser or one or more other displayed applications on such participant's endpoint device.

The record function 110 is configured control recording of conference media in response to command instructions from the command interface 56. The record function 110 may be invoked manually by the user in response to a user input (e.g., via participant interface 62) or in response to an NLP command determined from the mixed media stream (e.g., via NLP command interface 66), such as disclosed herein. Permission to invoke the record function 110 may be set according participant roles (e.g., in session data 74). The record function 110 thus can activate conference controls 58 to record one or more media streams and store the recording in memory. Start and stop recording as well as other related control functionality may be implemented via the participant interface, such as for each or one or more selected authorized participants.

The add participant function 112 is configured to add one or more new participants to an ongoing session in response to command instructions from the command interface 56. The add participant function 112 may be invoked manually by the user in response to a user input (e.g., via participant interface 62) or in response to an NLP command determined from the mixed media stream (e.g., via NLP command interface 66), such as disclosed herein. The add participant function 112 (or other conference controls) also may be configured to determine whether the participant requesting to add another participant possesses the required permissions to make such a request. Such permissions can either be stored as part of the participant data in session data 74 and, for example, may be user-programmable by the leader host or another administrator. As an example, in response to the add participant function 112 being invoked (e.g., by the command interface 56), for example, controls 58 cause the conference bridge dial the participants phone number and/or send a message (e.g., an instant message, SMS message or email) to the user to join the conference.

The drop participant function 114 is configured to disconnect one or more identified participants in response to command instructions from the command interface 56. The drop participant function 114 may be invoked manually by the user in response to a user input (e.g., via participant interface 62) or in response to an NLP command determined from the mixed media stream (e.g., via NLP command interface 66), such as disclosed herein. Similar to the add participant function 112, the drop participant function 114 (or other controls) is also configured to determine whether the participant requesting to disconnect a third participant possesses the required permissions to make such a request. Such permissions can either be stored as part of the participant data in session data 74, for example.

By way of example, NLP engine extracts an utterance of "Bob, why don't you share your screen." The NLP engine determines that the phrase "share your screen" defines a predicate associated with the intended command "share screen," and determines that Bob is the subject of such predicate and may be identified with a respective participant in the conference session. For example, the NLP engine 60 parses the utterance, by recognition module 80 performing speech recognition and NLP analysis module 82 processing the words and phrases with respect to the database 84 to return a corresponding command input (e.g., SHARE_SCREEN(BOB)). The NLP engine 60 provides the command input to the NLP command interface 66 to specify instructions to execute a selected command function 108 with respect to the subject of the command (e.g., Bob's conference web interface). The command interface 56, 102 thus can invoke the corresponding conferencing function 108 in response to the command input provided by NLP engine 60. In response, the conference controls 58 can utilize session controller 68 and media controller to create appropriate connections to enable the flow of media to implement the screen sharing function. Session data 74 would also be updated according to the function being executed.

As one example, the command interface 56, 102 may automatically invoke the SHARE_SCREEN function 108 to activate screen sharing functionality associated with the participant identified as Bob in the conference session. In some examples, such as where the function being invoked (e.g., screen sharing) involves interaction of one or more participants, the execution of such function can be conditioned on user input from the participant(s) to which the function has been applied. In such an example, the conference manager 54 may provide the participant, Bob, a request to confirm that the participant is ready and available to participate. For instance, the participant interface 62 can execute instructions to provide a dialog box or other graphical user interface (GUI) element as an overlay at his online interface, requesting a user input response before executing the share screen function 108 for such participant. In response to a positive response from the participant (e.g., clicking on "OK"), the share screen function can be executed for such participant. A negative response (e.g., clicking on "NO" or otherwise terminating the request), may result in execution of the invoked function being terminated. Additionally or alternatively, the leader of the conference session (e.g., as specified in session data 74) may similarly be provided a user interface request to confirm execution of the function.

As another example, a given participant may state, "Hey, Jim, good idea, how about you, me, Sue and Bob take a sidebar to discuss the issue," which may be extracted from the mixed media data 52 by NLP engine 60. The NLP engine 60 can perform speech recognition (e.g., by recognition module 80) to detect words and phrases in the extracted utterance. The NLP engine 60 can also perform analysis and processing (e.g., by analysis module 82) on the detected words determine the keyword "sidebar" matches an entry in the command database 84, corresponding to sidebar function of the command conferencing functions 64. NLP analysis module 82 also determines, based on searching the names database 84, that Bob, Sue and Jim and the speaker are intended participant-subjects associated with the determined sidebar function 106. The NLP engine 60 provides the command input to command interface 56 (via NLP command interface 66) to specify instructions to execute a selected conference function 106 with respect to the subject of the command. The conference manager 54 thus can invoke the corresponding sidebar conference function 106 in response to the command input provided by NLP engine 60, automatically or semi-automatically. Additionally, the conference controls 58 employ session controller 68 and media controller to create appropriate connections to enable the flow of media to implement the sidebar function, such as by creating a private conference bridge within the current session but that is separate. Session data 74 would also be updated accordingly. When the sidebar is completed, session controller can modify connections and/or media flow to rejoin the participants back into the main conference session.

While the examples described above, demonstrate sidebar and share screen conference functions, similar workflows may be implemented to invoke and terminate any of the conference functions 64.

Figure 4:
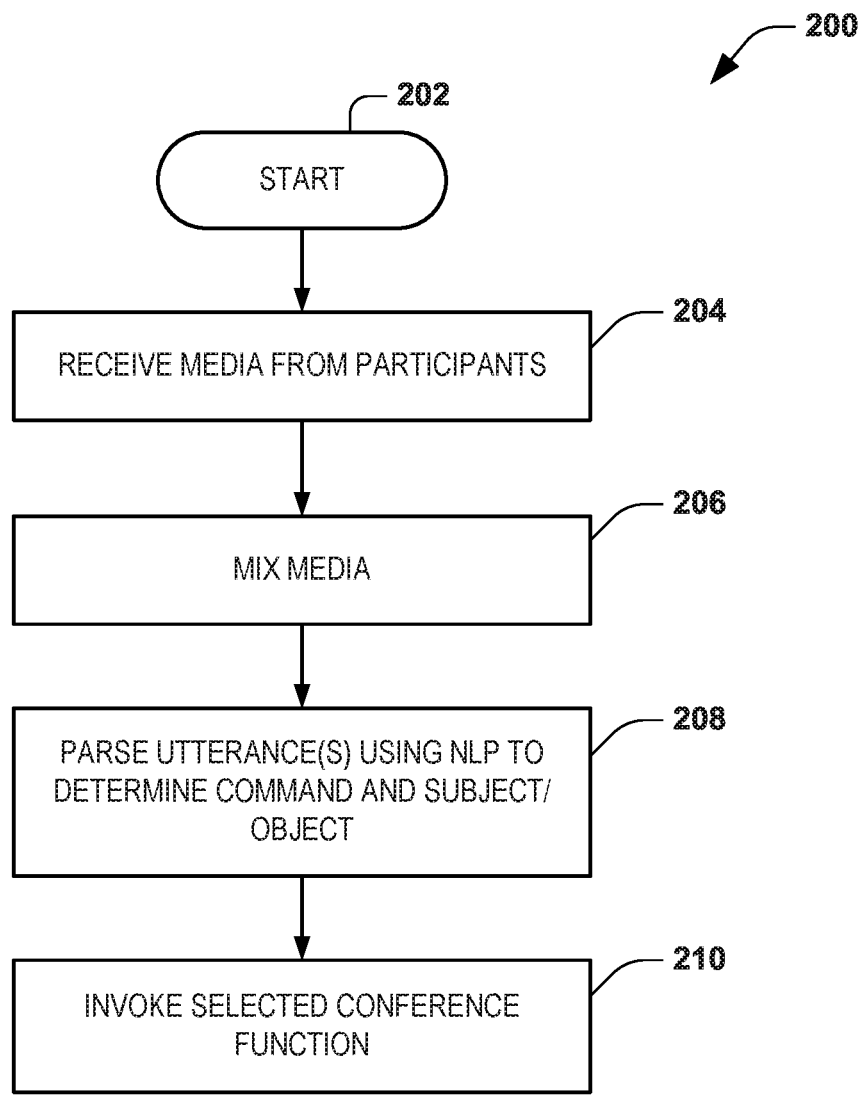
FIG. 4 is a flow diagram illustrating an example of a method for processing voice commands for a conference call.

In view of the foregoing structural and functional features described above, methods that can be implemented will be better appreciated with reference to FIG. 4. While, for purposes of simplicity of explanation, the method of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method. The methods or portions thereof can be implemented as instructions stored in one or more non-transitory storage media as well as be executed by a processor of a computer device, for example.

FIG. 4 depicts an example of a method 200 for processing voice commands for a conference session, such as may be implemented with respect to the conference system 10 or 50. The method 200 begins at 202 in which a conference session is initiated. This can include activating a conference bridge automatically or in response to one or more participants connecting with the conference session via one or more end point devices. For example, session controls and media controls create connections and provide for the flow of media for the session.

At 204, media is received from one or more participants during the conference session. The received media can be provided and received via any number of connections to which the conference system (e.g., system 10 or 50, including one or more conference bridge) is connected. At 206, the received media from the participants is mixed (e.g., by mixer 22, 53) to provide mixed media data. The mixed media data includes audio, such as voice audio received at 204 from one or more participants during the conference session. The mixed media can be distributed to participants via one or more conference bridges assigned to the conference session.

At 208, at least one utterance of the mixed media is parsed using NLP (e.g., by NLP engine 20, 60) to determine a command and one or more subject and/or object associated with the command. The method may loop between 204-208 to continue parsing utterances in the mixed media until a command is determined in one or more utterance. The NLP recognition and analysis at 208 can be implemented within the conference system or a corresponding extracted utterance may be sent (e.g., via API) to a server or other computing system to perform the NLP on each utterance. The NLP may return no response or a negative response when no command is determined. Alternatively, the NLP may provide a command input that includes a command and one or more subject and/or object associated with the command, such as disclosed herein. Each command is associated with a corresponding conference function (e.g., function 18 or 64) that may be implemented by the conference function.

In response to determining a command and subject/object from the mixed media, the method proceeds from 208 to 210 and the selected conference function is invoked (e.g., by command interface 56 of conference manager 16, 54). The conference function may be selected from a plurality of conference functions stored in memory in response to the command input. As mentioned, the invoked function may be executed automatically to implement the function or, in some examples, be semi-automatic as to require user input to trigger its execution. The subjects or objects associated with the command may be participants or participant endpoint devices, for example.

In some examples, such as disclosed herein the method 200 may also detect voice audio in the mixed media data and extract the at least one utterance from the mixed media in response to the detecting. Metadata may also be used by NLP at 208 to specifying a start time and an end time and to identify one or more participants that may speak the utterance or otherwise be mentioned in the utterance. The NLP at 208 further may convert each extracted utterance into corresponding text, which can be analyzed to determine the command input (e.g., according to a command schema defined for the conference session).

The parsing and NLP at 208 may be implemented with respect to a single utterance that contains the command and the at least one subject or object sufficient to invoke the conference function. In other examples, the NLP at 208 may be applied to multiple utterances to determine a single command and based on corresponding text from the multiple utterances.

The method 200 may also track a role of each identified participant in the conference call (e.g., stored in session data 74). Different participants thus may be assigned different subsets of the plurality of conference functions and corresponding rules associated with controlling invocation each of the plurality of conference functions may be applied according to the role of the participant who made the utterance or issued another command (e.g., via participant interface).

In situations where user input is needed to execute a conference function, a request is sent to a given participant for the selected conference function (e.g., via participant interface). For example, the request is sent to the given participant via graphical user interface associated with the given participant or a private media stream (e.g., audio or other media) to the given participant. Thus, the selected conference function is invoked in response to a user input from the given participant to confirm the request, or the selected conference function is cancelled in response to a negative user input from the given participant (e.g., to cancel the request). As mentioned, the given participant may be the subject or object determined by the NLP at 208 or it may be another participant having a predetermined role in the conference call, such as the leader.

In order to identify participants, the conference system implementing the method 200 may monitor each stream of the media received at 204 from the plurality of participants, and the determined subject or object may correspond to the identified participant. Metadata may be associated with the utterance as to identify which participant who is speaking each utterance. The identity can be determined based on session data. For instance, an identity of conference call participants may be registered with the conference manager (e.g., stored as session data) before or during the conference call, and each registered identity is associated with a respective stream of the media that is received at 204. Corresponding metadata thus may be generated and associated with each utterance that is parsed and processed at 208. As a result, an identity of each subject or object that is associated with a determined command may be determined based on the association of each registered identity.

As a further example, the execution of a command may be ambiguous, such as where the full intent of the command cannot be determined sufficiently at 208 (e.g., by NLP engine). For instance, an identity of the subject or object may be indeterminate based on processing one or more utterances. Thus, in response to determining an ambiguous, the method 200 may send a request to a given participant with at least one option to clarify the intent of the predicted conference function. The given participant may include the participant who spoke the utterance(s) and/or the conference leader. In response to receiving a user input from the given participant confirming the command, the method 200 generates the command input and executes the selected conference function.

As can be appreciated by those skilled in the art, portions of the invention may be embodied as a method, data processing system, or computer program product (e.g., a non-transitory computer readable medium having instructions executable by a processor). Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable non-transitory computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It can be understood that blocks of the illustrations, and combinations of blocks in the illustrations, can be implemented by computer-executable instructions. These computer-executable instructions may be provided to one or more processor cores of a general purpose computer, special purpose computer, or other programmable data processing apparatus (or a combination of devices and circuits)

to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What have been described above are examples. It is, of course, not possible to describe every conceivable combination of components or method, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or an equivalent thereof, it should be interpreted to include one or more than one such element, neither requiring nor excluding two or more such elements.

What is claimed is:

1. A method, comprising:
   receiving at a conference bridge media from a plurality of participants during a conference session;
   mixing the media received from the plurality of participants to provide mixed media;
   parsing a plurality of utterances of the mixed media using natural language processing, wherein each utterance of the plurality of utterances is associated with a respective participant of the plurality of participants;
   converting each utterance of the plurality of utterances into text; and
   analyzing a grammatical relationship and relative context of the text for a given utterance associated with a given participant of the plurality of participants to determine a command and the text for another utterance associated with an other participant of the plurality of participants that is prior to or after the given utterance to determine at least one subject or object associated with the command; and
   invoking a selected conference function during the conference session based on the determined command and each identified subject or object.

2. The method of claim 1, wherein the parsing further comprises:
   detecting voice audio in the mixed media;
   extracting the plurality of utterances from the mixed media in response to the detecting the voice audio, each extracted utterance including the detected voice audio and metadata associated with a corresponding participant specifying a start time and an end time for each extracted utterance; and
   wherein the analyzing is further based on the metadata for each extracted utterance to determine the command and the at least one subject or object according to a command schema defined for the conference session.

3. The method of claim 1, wherein the at least one object or subject includes one or more of the plurality of participants different from the given participant associated with the given utterance.

4. The method of claim 1, wherein the conference bridge includes a plurality of conference functions stored in memory, the method further comprising identifying the selected conference function from the plurality of conference functions based on the determined command.

5. The method of claim 4, further comprising:
   determining a role of each participant within the conference session; and
   assigning different subsets of the plurality of conference functions and rules associated with controlling invocation each of the plurality of conference functions according to the role of the participant who made the utterance.

6. The method of claim 4, wherein the invoking the selected conference function during the conference session is performed automatically by the conference bridge in response to the analyzing.

7. The method of claim 4 further comprising: in response to the analyzing and prior to invoking the selected conference function, sending a request to the other participant of the plurality of participants for the selected conference function, wherein the selected conference function is invoked in response to a positive user input from the other participant to confirm the request, or the selected conference function is canceled in response to a negative user input from the other participant.

8. The method of claim 7, wherein the other participant is the at least one subject or object associated with the command.

9. The method of claim 7, wherein the request is sent to the other participant via a graphical user interface associated with the other participant or a private media stream to the other participant.

10. The method of claim 1, further comprising:
    monitoring each stream of the received media from the plurality of participants; and
    identifying each participant from the plurality of participants who is speaking the given utterance and the other utterance; and
    determining the at least one subject or object further based on an identity of the each participant.

11. The method of claim 10, further comprising:
    registering an identity of at least some of the plurality of participants before or during the conference session; and
    associating each registered identity with a respective stream of the received media, the at least one subject or object being determined based on the association of a registered identity for the other participant.

12. The method of claim 1, in response to determining that the command is ambiguous, the method further comprises:
    sending a request to the other participant with at least one option for performing the command; and
    executing the command in response to receiving a user input from the other participant confirming the command.

13. The method of claim 1, further comprising:
    analyzing metadata associated with each utterance to determine an identity of the other participant from the plurality of participants, the metadata comprising information identifying the other participant; and invoking the selected conference function for the other participant further based on the identity of the other participant.

14. The method of claim 1, further comprising confirming an identity of the other participant prior to invoking the selected conference function for the other participant, wherein the selected conference function for the other participant is invoked in response to the confirming of the identity of the other participant.

15. The method of claim 1, wherein the selected conference function is further invoked based on one of a predetermined contract and a subscription.

16. The method of claim 1, wherein in response to invoking the selected conference function, at least one participant of the plurality of participants is disconnected from the conference session.

17. The method of claim 1, wherein the selected conference function is invoked for the other participant, wherein the selected conference function is a screen-sharing function.

18. A conference system, comprising:
   memory to store machine readable instructions and data;
   one or more processors to access the memory and execute the instructions, the instructions comprising:
      a natural language processing (NLP) engine to:
         parse a plurality of utterances of mixed media using natural language processing, wherein each utterance of the plurality of utterances is associated with a respective participant of the plurality of participants, wherein the mixed media comprises media received from a plurality of participants during a conference session;
         convert each utterance of the plurality of utterances into text, and
         analyze a grammatical relationship and relative context of the text for a given utterance associated with a given participant of the plurality of participants to determine a command and the text for another utterance associated with an other participant of the plurality of participants that is prior to or after the given utterance to determine at least one subject or object associated with the command; and
      a conference manager to invoke a selected conference function for execution for the other participant of the plurality of participants during the conference session based on the determined command and each identified subject or object.

19. The system of claim 18, wherein the conference manager further comprises a command processor to receive the determined command and each associated subject or object and to invoke the selected conference function for the other participant during the conference session.

20. The system of claim 19, wherein the command processor further comprises:
   an NLP command interface to receive the determined command from the NLP engine; and
   a participant interface to provide an interactive interface to enable one or more of the plurality of participants different from the given participant to input instructions to invoke the selected conference function.

21. The system of claim 19, wherein the conference manager further comprises conference controls to control conference connections and flow of media associated with the conference session, and wherein the conference controls modify the conference connections and/or the flow of media in response to the selected conference function being invoked for the other participant during the conference session.

22. The system of claim 20, wherein the NLP engine further comprises:
   an NLP analyzer to analyze the corresponding text and search a conference database to ascertain if each utterance includes the determined command and the at least one subject or object for the selected conference function, the NLP engine providing a command input to the NLP command interface to invoke the selected conference function for the other participant.

23. The system of claim 22, wherein the NLP engine further analyzes conference metadata associated with each utterance and provides the command input, corresponding to the determined command and the associated at least one subject or object, based on the metadata.

\* \* \* \* \*